Oct. 23, 1956   R. A. HEISING   2,767,753
ATTACHMENT MEANS FOR FORAGE HARVESTER CUTTER
Filed April 27, 1954
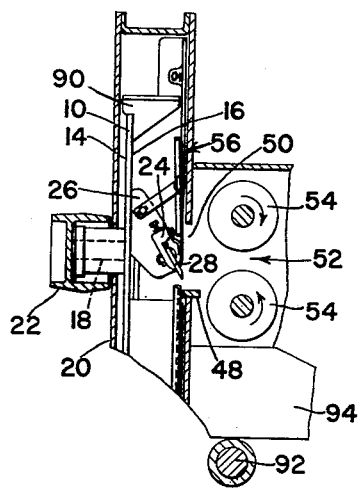
FIG. 2
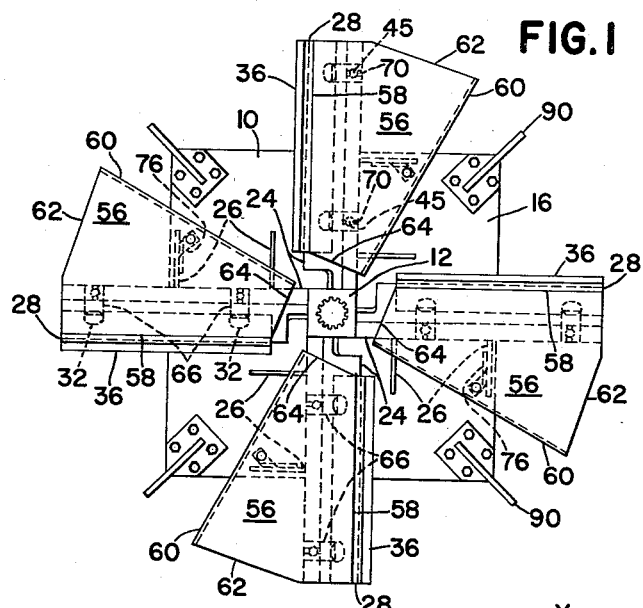
FIG. 1
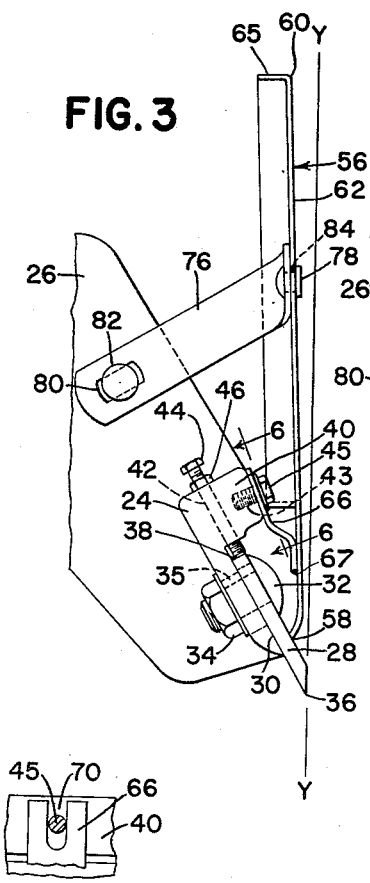
FIG. 3
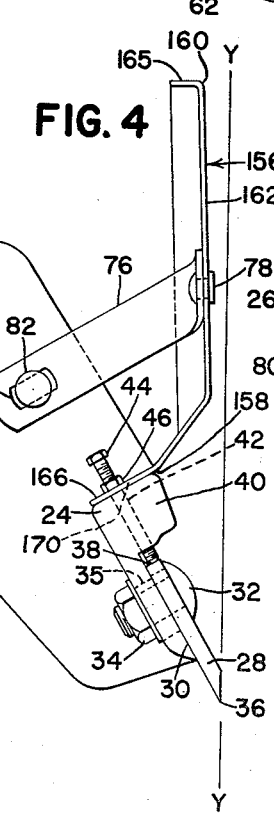
FIG. 4
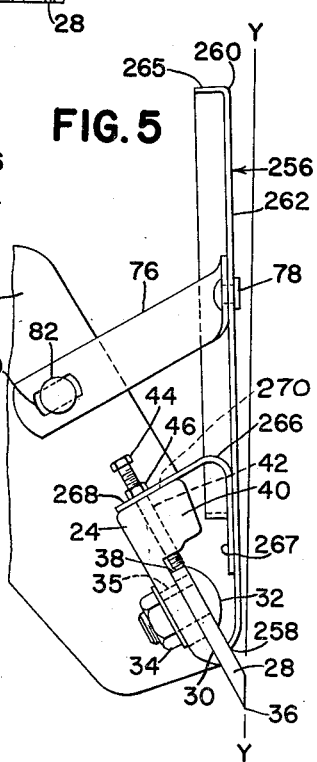
FIG. 5
FIG. 6
*INVENTOR.*
ROBERT A. HEISING
ATTORNEYS

# United States Patent Office 2,767,753
Patented Oct. 23, 1956

2,767,753

ATTACHMENT MEANS FOR FORAGE HARVESTER CUTTER

Robert A. Heising, Ottumwa, Iowa, assignor to Deere Manufacturing Co., Dubuque, Iowa, a corporation of Iowa Application April 27, 1954, Serial No. 425,785

10 Claims. (Cl. 146—129)

This invention relates to a rotary cutter, and particularly to an attachment for a rotary cutter as used in machines known as forage harvesters.

In a machine of the general class noted above, often called an ensilage cutter or an ensilage harvester, crops are fed by a horizontal conveyor to a cutter mounted for rotation on a horizontal axis parallel to the line of feeding. The cutter carries a plurality of radially arranged knives cooperative with a stationary cutter bar at about the level of the conveyor, so that as the crops move across the stationary cutter bar and into the path of the knives, the crops are cut or otherwise reduced. On the basis of long experience with machines of this type, it had been determined that the longer lengths of cut are more desirable than the shorter lengths. To this end, cutters or rotors have been generally improved so that the cutting plane through which the knives travel is spaced axially from the supporting structure for the knives, thus enabling the crops to move a greater distance into the housing in which the cutter is carried before being cut by the knives. Representative patents disclosing structure of the nature just outlined are Hill 2,510,633, Tuft 2,457,959 and Hill 2,313,872.

The rotary cutter design based on these patents, and particularly that based on Hill 2,510,633, has found great commercial favor but, as in many cases in which substantial perfection is achieved, there arises a condition now and then in which the design presents drawbacks. One such condition in the case of the cutter referred to occurs in the reducing of crops that are predominantly corn ears or cobs, as in corn silage. In this circumstance, the substantially large angular spaces between the radially arranged knives permits the cobs and ears to flow in and thus to escape reduction by the knives. Although, as stated above, longer cuts in most crops are preferred to shorter cuts, it is also desirable to reduce the cobs, since the original lengths thereof are too great for silage.

According to the present invention, all the advantages of the basic design are retained but the disadvantages peculiar to corn ensilage and like material are eliminated by the provision of removable shield means or filler elements adapted to be mounted on the rotor in such manner as to respectively at least partially fill the angular spaces between the knives. It is an important object of the invention to provide these shield means as attachments constituting a set, there being as many shields or elements as there are knives, and each being attached to or near to a knife to extend from the knife in a trailing direction but terminating short of the next adjacent trailing knife. The invention features the provision of the shield or element in the form of a plate-like structure in which the plate, when mounted, is disposed axially inwardly of the cutting plane so as not to interfere with the cutting action of the rotor, and preferably at a slight inward angle to the cutting plane. Further objects of the invention reside in the novel mounting means, the provision for accommodation of adjusting structure on the rotor, and a design in which attachment and removal of the shield means is a simple matter.

The foregoing and other important objects and desirable features inherent in and encompassed by the invention will become apparent as a preferred embodiment of the invention is described in detail in the following specification and as illustrated in the accompanying sheets of drawings, the several figures of which will be described immediately below.

Fig. 1 is a face view of the rotor, from its cutting side, showing the mounting of the shield elements.

Fig. 2 is a fragmentary longitudinal sectional view showing the relationship between the rotor, its housing and part of the feed means for delivering material to the rotor.

Fig. 3 is an enlarged elevational view showing the mounting of a shield or filler element on the associated knife and knife support.

Fig. 4 is similar to Fig. 3 showing a modification in the mounting of a shield or filler element on the associated knife and knife support.

Fig. 5 is similar to Fig. 3 showing still a further modification in the mounting of a shield or filler element on the associated knife and knife support.

Fig. 6 is a sectional view taken along lines 6—6 of Fig. 3.

The rotor, best shown by itself in Fig. 1, comprises a rotary member or rotor plate 10 having hub means 12 and opposite radial faces 14 and 16, the former being a back face and the latter a front face. Reference hereinafter to the rotor face will be to the face 16.

The hub 12 enables journaling of the rotor plate 10 on a fixed shaft 18 in a rotor housing 20. The housing is of generally conventional construction. An input pulley 22 is fixed to the hub 12 so that the rotor may be belt-driven. These details are merely representative of other forms that the design could take.

The rotor structure is generally like that in Hill 2,510,633 and has a plurality of uniformly angularly spaced elongated arms 24 arranged in generally radiating fashion as respects the axis of the hub means 12. These arms are disposed in uniform axially spaced relation to the front of the front rotor face 16 and each arm is mounted on the rotor by support means 26, which means may take any suitable form, here being shown as a casting integral with the associated arm 24.

Each arm carries thereon an elongated cutting knife 28, the arm 24 having an inclined mounting surface 30 against which the rear side of the knife abuts. The knife is mounted on the associated arm 24 by knife-securing means in the form of a pair of releasable and re-securable members such as carriage bolts 32 having nuts 34. The arm 24 is slotted at 35 to receive the associated bolts 32 and to allow a limited amount of adjustment of the bolt relative to the arm when the nuts 34 are loosened. The knife 28 is apertured in two places tot receive the associated bolts 32.

Each knife has a leading cutting edge 36 and a trailing back or non-cutting edge 38. As seen in Fig. 3, the arm 24 includes an upper portion 40 that overhangs forwardly of the back edge 38 of the associated knife. This portion 40 is drilled and tapped, as at 42, to receive releasable adjusting means in the form of a screw 44 retained in adjusted position by a lock nut 46, and as at 43 to receive the threaded bolts 45 for purposes later explained. There are two adjusting means, but only one appears in the drawings. The presence of the other is believed to be obvious, particularly with reference to the patents mentioned above.

The knives 28 are mounted on their respective arms 24 and are adjusted by means of the releasable and re-securable members 32 and the adjusting means 44 so that the cutting edges 36 lie in a cutting plane normal to the axis of the hub means 12 and axially offset from the rotor face 16. When the rotor rotates, the cutting edges 36 of the knives cooperate in succession with a fixed cutter bar 48 carried at the lower edge of a feed opening 50 in a front wall of the rotor housing 20. Material is conveyed in the direction of the arrow 52 and is fed between a pair of feed rolls 54, which rotate as indicated, through the feed opening 50 and into the path of the knives 28. Because of the axial offset between the cutting plane and the rotor face 16, material fed by the feed rolls 54 may move a substantial distance into the housing before being obstructed by the rotor face 16, whereupon the length of cut is increased. The speed of the speed rolls 54 can, of course, be regulated so as to vary the length of the cut, all as pointed out particularly in the above-noted patent to Hill. From this, it will be seen that in the case of corn silage, ears and cobs, because of their relative rigidity, may easily move into the space between the knives and the rotor face 16 and thus avoid reduction. As pointed out above, this disadvantage is eliminated according to the present invention by the provision of a plurality of removable shield means or filler elements, each of which is designated generally by the numeral 56, there being as many elements as there are angular spaces between the neighboring pairs of knives 28. The angular space between a knife 28 and its next adjacent trailing knife occurs between the trailing edge 38 of one knife and the cutting edge 36 of the next adjacent knife. Because of the substantial angular space, combined with the axial spacing between the cutting plane and the rotor face 16, ears and cobs and other short rigid material may easily enter the rotor housing without reduction by the knives. As will be generally apparent in Figs. 1 and 2, the filler elements respectively occupy parts of these angular spaces, and thus form an obstruction to the inward movement of the fed material, thereby reducing the angular space ahead of the cutting edge of each knife and consequently affording that knife a better opportunity to reduce that material. Each filler element lies generally in the cutting plane but preferably at a slight angle (on the order of 8°) thereto as shown by the line Y—Y in Fig. 3.

Each element or shield means 56 comprises a plate-like structure having a generally triangular shape formed by a pair of long edges 58 and 60, a short edge 62 and an apex portion 64. The element is arranged with its apex portion toward the hub means 18, with its short edge extending generally circumferentially in a trailing direction and terminating short of the cutting edge of the next adjacent trailing knife, with one of its long edges 60 running radially inwardly to the apex portion 64 in angularly spaced relation to the cutting edge of the next adjacent cutting edge and with its other long edge 58 abutting the face of the knife 28. The one long edge 60 has an angularly related flange 65 thereon to afford rigidity.

Each of the elements 56 is mounted on its associated knife and related arm by means of a pair of brackets 66, which are fixed by welding, as at 67, to the rotor plate side of the element 56 and projects to a position adjacent to the upper portion 40 of the arm 24. Each bracket has an open end slot 70 (see Fig. 6) or aperture to receive the headed ends of the bolts 45. Therefore, with the shield mounting means as above described, it is a relatively easy matter to mount the element on the knife, all that is required being the temporary loosening of the bolts 45 so that the slots 70 will slide beneath the headed ends of the bolts, after which the bolts are tightened. Thus, the bolts serve to releasably connect the element 56 to the arm 24.

Looking at Fig. 3 in conjunction with the description of the knife securing and shield securing means, it can be seen that each element 56 has a contiguous coplanar portion thereof extending into proximity to but axially offset from the leading edge 36 of the associated knife 28, that will cover the knife securing means but will be structurally free from and independent of the knife securing means.

Additional mounting means is provided on each element in the form of a brace 76 rigidly secured at 78 to the element and projecting rearwardly from the rear face thereof. Each brace is apertured at 80 at its rear or inner end to receive securing means in the form of a bolt 82 by means of which the brace is rigidly attached to the associated support 26. The numeral 84 in Fig. 3 designates the opening by means of which the brace 76 is riveted or otherwise secured to the element 56 at the point 78 previously described.

As each knife 28 wears and is sharpened, its cutting edge 36 must be relocated relative to the cutting plane. This is accomplished by adjusting the knife outwardly and toward the radial plane by means of the releasable and resecurable elements 32—34 and the slots 35 in the knife-carrying arm 24, the lock nuts 46 on the screws 44 being released so that the screws may be tightened to engage the non-cutting edge 38 of the knife and to propel the knife in the necessary direction. After proper adjustment is obtained, the nuts 34 and 46 are tightened and the knife is secured.

In conditions in which it is undesirable to use the shield elements 56, they may be readily removed by reversing the attaching process previously described.

In Fig. 1, the numeral 90 represents paddles conventionally carried on the rotor. In Fig. 2, the numeral 92 represents the axle of the machine on which the rotor housing 20 is carried by means of supporting framework 94. A detailed comprehension of the parts 90, 92 and 94 is not necessary to an understanding of the present invention.

Figures 4 and 5 show modifications in the shield means and their securing means to the arm structure 24. First, with reference to Fig. 4, a shield element 156 has one long edge 160, an angularly related flange 165, an apex portion (not shown) and a trailing edge 162 that are similar to and that serve the same purposes as their counterparts previously described in relation to Figs. 1, 2 and 3. A bracket or flange portion 166 that connects the arm 24 to the shield element 156 comprises an integral part of the latter and is bent at an edge or bend line 158 in a direction axially rearwardly of the plane of the shield and overlies the top of the upper portion 40 of the arm 24. The bracket portion 166 has open end slots or apertures 170 similar to the type shown in the bracket 66 of Fig. 6, which fit about the adjusting screws 44. The lock nuts 46 releasably secure the bracket portion to the arm 24.

Now, with reference to the modification shown in Fig. 5, the shield means 256 has one long edge 260, an angularly related flange 165, an apex portion (not shown), a trailing edge 262, and a long edge 258 that abuts the face of the knife 28, that are not unlike their counter-parts shown in Fig. 3. A pair of brackets 266, only one of which is visible in Fig. 5, are of an inverted V-shaped cross section, with each bracket having one leg 267 fixed as by welding to the shield means 256 and the other leg 268 overlying the top of the upper portion 40 of the arm 24, and having therein open end slots or apertures 270, similar to the type shown in the bracket 66 of Fig. 6, which receive the adjusting screws 44. The lock nuts 46 releasably secure the bracket 266 to the arm 24.

The shield means 156, 256 of Figs. 4 and 5 are both removable by loosening the lock nuts 46 and sliding the brackets 166, 266 out from under the nuts. Other details are similar to those already described and will not be repeated inasmuch as they are, I believe, obvious by reference to the drawings and the previous description.

The rotor shown here has been described with respect to the radiating arms 24. It will be understood, however, that the arms may be arranged so that they do not lie exactly on radii from the hub 12, as in the above-noted Tuft patent. These variations are, of course, immaterial to the accomplishment of the objects of the invention. Various other modifications and alterations in the preferred embodiment of the invention disclosed herein, as well as the accomplishment of specific objects and features not specifically enumerated, will undoubtedly occur to those versed in the art, without departing from the spirit and scope of the invention.

What is claimed is:

1. An attachment shield for mounting on a radial knife structure of a cutter rotor in which the knife structure includes an elongated generally radial arm and a radial knife lying along said arm and having a leading cutting edge effective in a radial cutting plane normal to the rotor axis and axially offset in one direction from the arm and a trailing edge axially offset in an opposite direction from said cutting plane, knife securing means cooperative between the knife and arm to fix the knife on the arm and releasable to enable adjustment of said knife on said arm; and adjusting means mounted on the arm and axially offset in said opposite direction from the knife and operative to engage and adjust the released knife; said shield comprising: a plate-like element of generally triangular shape having a pair of long edges, a short edge and an apex portion; said element being arranged with one long edge lying along the associated knife-and-arm structure, its short edge extending generally circumferentially in a trailing direction, and its other long edge running radially inwardly to said apex portion, the plane of said element being generally axially offset in said opposite direction from the cutting plane; and shield-mounting means for removably mounting the shield means respectively on the arm-and-knife structures and including a releasable connection adapted to connect the shield to the arm independent of the knife-securing means.

2. The invention defined in claim 1, in which the shield-mounting means includes a bracket portion on the associated shield element adapted for connection to the associated knife-adjusting means.

3. The invention defined in claim 1, in which: the arm of each knife-and-arm structure has a tapped bore therein generally parallel to the plane of the associated knife, the knife-adjusting means includes an adjusting screw received by the associated tapped bore and engageable with the associated knife, and a lock nut threaded on the adjusting screw; and said bracket portion on the shield element is further characterized by having an aperture therein receivable by the adjusting screw between the arm and lock nut.

4. The invention defined in claim 3, in which: said shield element has a contiguous coplanar portion thereof extending into proximity to but axially offset in said opposite direction from the leading edge of the knife, said contiguous portion covering but being structurally free from the associated knife-securing means.

5. The invention defined in claim 3, in which: the bracket portion on each shield element comprises an integral part of the shield element directed axially in said opposite direction from the plane of the shield element to overlie the associated arm.

6. The invention defined in claim 1, in which: said shield element has a contiguous coplanar portion thereof extending into proximity to but axially in said opposite direction from the leading edge of the associated knife, said contiguous portion covering but being structurally free from the associated knife-securing means.

7. An attachment shield for mounting on a radial knife structure of a cutter rotor in which the knife structure includes an elongated generally radial arm and a radial knife lying along said arm and having a leading cutting edge effective in a radial cutting plane and axially offset in one direction from the arm and a trailing edge axially offset in the opposite direction from said cutting plane, knife securing means being cooperative between the knife and arm to fix the knife on the arm and releasable to enable adjustment of said knife on said arm; and adjusting means being mounted on the arm and axially offset in said opposite direction from the knife and operative to engage and adjust the released knife; said shield means comprising: a plate-like element having a mounting edge lying along the associated knife-and-arm structure the plane of said element being generally axially offset in said opposite direction from the cutting plane; and shield-mounting means removably mounting the shield on the arm-and-knife structure, said shield-mounting means including a releasable connection adapted to connect the shield to the arm independent of the associated knife-securing means.

8. The invention defined in claim 7, in which: said shield-mounting means includes a bracket portion fixed to the shield element and connectible with the associated knife-adjusting means.

9. The invention defined in claim 7, in which: the arm of said knife-and-arm structure has a tapped bore therein generally parallel to the plane of the associated knife, each knife-adjusting means includes an adjusting screw received by the associated tapped bore and engageable with the associated knife, and a lock nut threaded on the adjusting screw and each shield-mounting means is further characterized by having a bracket portion on the associated shield element having an aperture therein receivable by the associated adjusting screw between its arm and lock nut.

10. The invention defined in claim 9, in which: each shield element has a contiguous coplanar portion thereof normally extending into proximity to but axially offset in said opposite direction from the leading edge of the associated knife, whereby said contiguous portion will cover but remain structurally free from the associated knife-securing means.

References Cited in the file of this patent

UNITED STATES PATENTS

| | | |
|---|---|---|
| 773,483 | Drew | Oct. 25, 1904 |
| 2,312,612 | Wetmore | Mar. 2, 1943 |
| 2,510,633 | Hill | June 6, 1950 |